(12) United States Patent
Takiue

(10) Patent No.: US 10,189,949 B2
(45) Date of Patent: *Jan. 29, 2019

(54) TRANSPARENT POLYIMIDE COPOLYMER, POLYIMIDE RESIN COMPOSITION AND MOLDED ARTICLE, AND PRODUCTION METHOD OF SAID COPOLYMER

(71) Applicant: SOMAR CORPORATION, Tokyo (JP)

(72) Inventor: Yoshiyasu Takiue, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/903,506

(22) PCT Filed: Jul. 7, 2014

(86) PCT No.: PCT/JP2014/068017
§ 371 (c)(1),
(2) Date: Jan. 7, 2016

(87) PCT Pub. No.: WO2015/008643
PCT Pub. Date: Jan. 22, 2015

(65) Prior Publication Data
US 2016/0168328 A1    Jun. 16, 2016

(30) Foreign Application Priority Data

Jul. 16, 2013  (JP) ................. 2013-148057

(51) Int. Cl.
*C08L 77/00*     (2006.01)
*C08G 73/10*     (2006.01)
*C09D 179/08*    (2006.01)

(52) U.S. Cl.
CPC ....... *C08G 73/1028* (2013.01); *C08G 73/105* (2013.01); *C08G 73/1039* (2013.01);
(Continued)

(58) Field of Classification Search
CPC .... C08G 73/10; C08G 73/1042; C08G 79/08; H05K 2201/0154
See application file for complete search history.

(56) References Cited

U.S. PATENT DOCUMENTS 4,629,777 A * 12/1986 Pfeifer ............... C08G 73/1046
                                                  430/270.1
4,897,092 A    1/1990 Burgoyne, Jr. et al.
(Continued)

FOREIGN PATENT DOCUMENTS

JP       2-160832 A    6/1990
JP       2-261524 A    10/1990
(Continued)

OTHER PUBLICATIONS

Fang et al. "Synthesis of soluble polyimides for vertical alignment of liquid crystal via one-step method", European Polymer Journal 46 (2010) 1163-1167.
(Continued)

*Primary Examiner* — Shane Fang
(74) *Attorney, Agent, or Firm* — Birch, Stewart, Kolasch & Birch, LLP

(57) ABSTRACT

Provided are: a transparent polyimide copolymer which satisfies solvent solubility, storage stability, heat resistance, mechanical strength and thermal yellowing resistance at high levels and has excellent utility; a polyimide resin composition; a molded article; and a production method of the copolymer. The transparent polyimide copolymer is obtained by copolymerizing: (A) 4,4'-oxydiphthalic dianhydride and/or 2,2-bis(3,4-dicarboxyphenyl)hexafluoropropane dianhydride; and (B) at least one diamine and/or diisocyanate represented by the following Formulae (1) to (3):

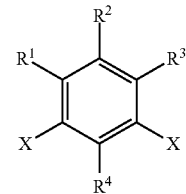

(1)

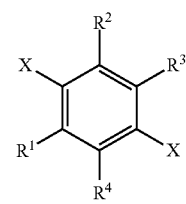

(2)

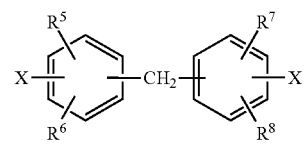

(3)

(wherein, X represents an amino group or an isocyanate group; $R^1$ to $R^8$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^8$ is not a hydrogen atom).

9 Claims, No Drawings

(52) U.S. Cl.
CPC ..... *C08G 73/1042* (2013.01); *C08G 73/1053* (2013.01); *C08G 73/1064* (2013.01); *C08G 73/1067* (2013.01); *C08G 73/1071* (2013.01); *C09D 179/08* (2013.01)

(56) References Cited

U.S. PATENT DOCUMENTS

| | | | |
|---|---|---|---|
| 4,912,197 | A | 3/1990 | Hayes |
| 4,932,982 | A | 6/1990 | Hayes |
| 4,981,497 | A | 1/1991 | Hayes |
| 5,649,045 | A | 7/1997 | Fjare et al. |
| 5,750,641 | A | 5/1998 | Ezzell et al. |
| 6,139,926 | A | 10/2000 | Auman et al. |
| 2002/0192445 | A1 | 12/2002 | Ezzell et al. |
| 2005/0256295 | A1 | 11/2005 | Sakayori |

FOREIGN PATENT DOCUMENTS

| | | |
|---|---|---|
| JP | 3-21336 A | 1/1991 |
| JP | 3-65228 A | 3/1991 |
| JP | 4-288331 A | 10/1992 |
| JP | 5-271411 A | 10/1993 |
| JP | 8-179539 A | 7/1996 |
| JP | 9-258043 A | 10/1997 |
| JP | 2000-1613 A | 1/2000 |
| JP | 2000-511296 A | 8/2000 |
| JP | 2001-40209 A | 2/2001 |
| JP | 2003-176354 A | 6/2003 |
| JP | 2005-314673 A | 11/2005 |
| JP | 2008-163210 A | 7/2008 |
| JP | 2010-235641 A | 10/2010 |
| JP | 2011-140563 A | 7/2011 |
| JP | 2011-144260 A | 7/2011 |
| WO | WO 02/090452 A2 | 11/2002 |

OTHER PUBLICATIONS

International Search Report, issued in PCT/JP2014/068017, dated Oct. 7, 2014.

Li et al. "Polyimide Thin Films as Compensators for Liquid Crystal Displays", Polymers for Advanced Technologies, vol. 8, (1997), pp. 513-516.

Written Opinion of the International Searching Authority, issued in PCT/JP2014/068017, dated Oct. 7, 2014.

"Resins and Plastics" Chemical Industry Encyclopedia, Special volume, Jan. 2003, p. 953, with partial translation.

* cited by examiner

TRANSPARENT POLYIMIDE COPOLYMER, POLYIMIDE RESIN COMPOSITION AND MOLDED ARTICLE, AND PRODUCTION METHOD OF SAID COPOLYMER

TECHNICAL FIELD

The present invention relates to a transparent polyimide copolymer (hereinafter, also referred to as "polyimide copolymer"). More particularly, the present invention relates to: a transparent polyimide copolymer which satisfies solvent solubility, storage stability, heat resistance, mechanical strength and thermal yellowing resistance at high levels and has excellent utility; a polyimide resin composition; a molded article; and a production method of the copolymer.

BACKGROUND ART

In recent years, in the field of display devices such as liquid crystal displays and organic electroluminescent displays, due to the demands for reduction in weight and thickness, improvement in flexibility, resistance to breakage and the like, glass substrate and cover glasses have been replaced to plastic substrates. Particularly, in personal digital assistants such as mobile phones, smart phones and tablet PCs, there is a strong demand for plastic substrates.

Moreover, LEDs (Light Emitting Diodes) which is taking advantage of the characteristic features such as long service life and low power consumption, have been expanding their range of use to various applications including general household lighting, automotive lighting and backlights of liquid crystal displays. In response to the demand for miniaturization of information terminal devices such as mobile phones, smart phones and tablet PCs, LED elements are increasingly surface-mounted on circuit boards. In those cases where LED elements are surface-mounted on a circuit board, for the efficiently extracting the emitted light from the LEDs to the front, a reflective layer is commonly formed on the circuit board surface. The material of the reflective layer used in such cases is obtained by filling a white pigment into a transparent resin at a high concentration. However, many kinds of the transparent resins that are conventionally used have problems in that they induce yellowing when exposed to a high-temperature condition for a prolonged period and their reflectance is thus decreased with time. In association with increase in the brightness of LEDs, There is an ever increasing trend for the calorific value of LEDs; therefore, it is in urgent need to improve such thermal yellowing.

It is strongly demanded that developing a resin material which has not only heat resistance and mechanical properties that conform to these market requirements but also, excellent transparency from the viewpoint of design properties as well as to realize the high visibility and is possible to highly inhibit the yellowing caused by exposure to heat and light.

Among organic materials, polyimides are known as polymeric materials that have the highest levels of heat resistance, chemical resistance and electrical insulation properties. In the electrical and electronic industries, for example, "KAPTON (registered trademark)" manufactured by DuPont, which is polymerized from pyromellitic dianhydride (PMDA) and 4,4'-diaminodiphenyl ether (pDADE), and "UPILEX (registered trademark)" manufactured by Ube Industries, Ltd., which is polymerized from biphenyltetracarboxylic dianhydride (BPDA) and p-phenylene diamine (pPD), have been widely used as heat-resistant insulating materials. However, these polyimides have a disadvantage in that they are colored in yellowish brown under a steady state due to intramolecular conjugation and formation of charge transfer complexes.

In order to solve this disadvantage, a number of methods have been proposed so far. Specifically, there have been proposed, for example, a method where a fully aliphatic polyimide entirely constituted by an aliphatic and/or alicyclic compound without any aromatic compound being used as a polyimide constituent is utilized for inhibiting coloration caused by intramolecular conjugation (see, for example, Patent Document 1); a method of obtaining a semi-aliphatic polyimide satisfying both heat resistance and transparency by using an aromatic compound as either an acid anhydride or diamine component and an aliphatic and/or alicyclic compound as the other component (see, for example, Patent Document 2); a method of utilizing a flexible polyimide in which the formation of intermolecular charge transfer complexes is inhibited by incorporating, as constituents, an acid dianhydride and/or a diamine that contain a sterically bulky substituent(s) and/or have a flexible structure (see, for example, Patent Documents 3 and 4); and a method of providing transparency by utilizing the structural distortion of a 7-membered cyclic acid dianhydride to force node formation in $\pi$-conjugated system and to thereby localize $\pi$-electrons (see, for example, Patent Document 5).

In the method where an aliphatic and/or alicyclic compound is used as a constituent of a polyimide, there are problems that the aliphatic material causes deterioration in the heat resistance and mechanical strength and that yellowing occurs due to oxidation in a heat-treatment process. The problem of heat resistance can be improved by incorporating a rigid aromatic material into the resin structure; however, such a polyimide usually has a decreased transparency and is often hardly soluble to solvents. Therefore, a coating film is formed using a polyamic acid solution which is a precursor, and the resulting film is subsequently thermally or chemically imidized. However, the polyamic acid solution is easily affected by the humidity, handling and storage thereof are difficult.

Meanwhile, in the method of utilizing a flexible polyimide, although excellent solubility to organic solvents and excellent transparency are attained, the polyimide is not possible to ensure sufficient heat resistance by a reduction of the glass transition temperation (Tg) caused by the flexible structure.

Further, in the method of providing transparency by utilizing the structural distortion, it is required to use a special material which is an acid dianhydride having a 7-membered ring structure and the 7-membered ring is an unstable as a constituent; therefore, the resultant is likely to have insufficient mechanical strength, long-term heat resistance and thermal yellowing resistance.

RELATED ART DOCUMENTS

Patent Documents

Patent Document 1: Japanese Unexamined Patent Application Publication No. 2011-144260
Patent Document 2: Japanese Unexamined Patent Application Publication No. 2003-176354
Patent Document 3: Japanese Unexamined Patent Application Publication No. 2010-235641
Patent Document 4: Japanese Unexamined Patent Application Publication No. 2011-140563

Patent Document 5: Japanese Unexamined Patent Application Publication No. 2005-314673

SUMMARY OF THE INVENTION

Problems to be Solved by the Invention

As methods for improving the transparency of a polyimide, a number of methods have been examined as described above; however, none of them can eliminate the trade-off relationship in the balance of the demanded characteristics and sufficiently satisfy all of the demanded characteristics.

Specifically, in the methods of using an aliphatic polyimide or semi-aliphatic polyimide, a deterioration in the mechanical strength, a decrease in the thermal decomposition temperature and yellowing caused by oxidation during heating cannot be avoided. Furthermore, in the method of utilizing a flexible polyimide, since a reduction in the imide group concentration in the polyimide resin leads to a decrease in the glass transition temperature and the like, a practical level of heat resistance cannot be ensured. Meanwhile, in the method where an acid dianhydride having a 7-membered ring structure is used and the resulting polyimide is made transparent by a technique of utilizing the structural distortion of the acid dianhydride to promote forced node formation in conjugated π-electron system, effective results have been obtained with regard to the transparency and heat resistance; however, because of the unstable structure of the 7-membered ring, a problem may occur in terms of the mechanical strength and thermal yellowing resistance.

The present invention was made to solve the above-described problems and an object of the present invention is to provide: a transparent polyimide copolymer which satisfies solvent solubility, storage stability, heat resistance, mechanical strength and thermal yellowing resistance at high levels and has excellent utility; a polyimide resin composition; a molded article; and a production method of the copolymer.

Means for Solving the Problems

The present inventor intensively studied to solve the above-described problems and consequently discovered that the problems can be solved by copolymerizing a prescribed acid dianhydride with a diamine and/or diisocyanate having a prescribed structure, thereby completing the present invention.

That is, the present invention includes:

[1] A transparent polyimide copolymer obtained by copolymerizing: (A) 4,4'-oxydiphthalic dianhydride and/or 2,2-bis(3,4-dicarboxyphenyl)hexafluoropropane dianhydride; and (B) at least one diamine and/or diisocyanate represented by the following Formulae (1) to (3):

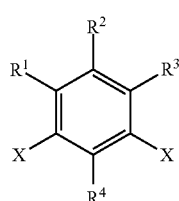
(1)

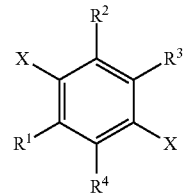
(2)

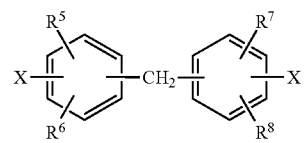
(3)

(wherein, X represents an amino group or an isocyanate group; $R^1$ to $R^8$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^8$ is not a hydrogen atom);

[2] The transparent polyimide copolymer according to [1], having no amino group terminal;

[3] The transparent polyimide copolymer according to [1], wherein two of the $R^1$ to $R^4$ in the Formula (1) or (2) of the (B) are ethyl groups and the other two are a methyl group and a hydrogen atom;

[4] The transparent polyimide copolymer according to [1], wherein the $R^5$ to $R^8$ in the Formula (3) of the (B) are each an alkyl group having 1 to 4 carbon atoms;

[5] The transparent polyimide copolymer according to [1], wherein (C) second acid dianhydride and/or (D) second diamine and/or diisocyanate is/are further copolymerized;

[6] A polyimide resin composition comprising the transparent polyimide copolymer according to [1];

[7] A molded article obtained by molding the polyimide resin composition according to [6];

[8] A method of producing a transparent polyimide copolymer, the method comprising:

the oligomer production step of producing an oligomer of transparent polyimide copolymer by copolymerizing (A) 4,4'-oxydiphthalic dianhydride and/or 2,2-bis(3,4-dicarboxyphenyl)hexafluoropropane dianhydride with (B) at least one diamine and/or diisocyanate represented by the following Formulae (1) to (3):

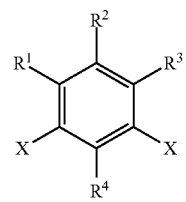
(1)

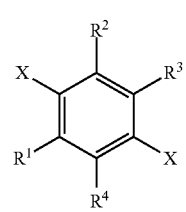
(2)

-continued

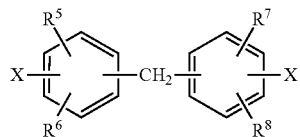

(wherein, X represents an amino group or an isocyanate group; $R^1$ to $R^8$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^8$ is not a hydrogen atom); and the polyimide copolymer production step of producing a transparent polyimide copolymer by copolymerizing the oligomer of transparent polyimide copolymer produced in the oligomer production step with (C) second acid dianhydride and (D) second diamine and/or diisocyanate;

[9] The method of producing a transparent polyimide copolymer according to [8], wherein the oligomer of transparent polyimide copolymer produced in the oligomer production step has an acid terminal;

[10] The method of producing a transparent polyimide copolymer according to [8], wherein two of the $R^1$ to $R^4$ in the Formula (1) or (2) of the (B) are ethyl groups and the other two are a methyl group and a hydrogen atom; and

[11] The method of producing a transparent polyimide copolymer according to [8], wherein the $R^5$ to $R^8$ in the Formula (3) of the (B) are each an alkyl group having 1 to 4 carbon atoms.

In the present invention, in order to allow the polyimide copolymer to have both transparency and heat resistance (a high Tg), the following method was employed. First, coloration caused by delocalization of π-electron system was inhibited by introducing a linking group that has a function of dividing then-conjugated system of ether, methylene or the like to the main chain structure.

However, the use of this method is known to induce a marked decrease in the glass transition temperature. Thus, the present inventor focused his attention on the imide group concentration in the polyimide main chain skeleton as a factor for controlling the glass transition temperature of the resulting polyimide. The glass transition temperature of a polyimide increases as the imide group concentration increases. Yet, an increase in the imide group concentration leads to a reduction in the transparency and solvent solubility.

In the light of this, the present inventor discovered that the above-described problems can be improved by using a monocyclic or bicyclic component (B) which comprises a bulky substituent at the ortho position of an amino group and/or isocyanate group and has a bended structure. Specifically, the intermolecular interaction can be weakened by introducing a bulky substituent and a bended structure to the main chain. By this reduction in the intermolecular interaction, not only the formation of a charge transfer complex can be inhibited but also the solvent solubility can be improved.

That is, the transparency of the polyimide copolymer was realized by the use of the component (A), and the glass transition temperature and the solvent solubility were improved while maintaining the transparency by the use of the component (B).

Effects of the Invention

According to the present invention, a transparent polyimide copolymer which satisfies solvent solubility, storage stability, heat resistance, mechanical strength and thermal yellowing resistance at high levels and has excellent utility; a polyimide resin composition; a molded article; and a production method of the copolymer can be provided.

Mode for Carrying Out the Invention

Modes for carrying out the present invention will now be described in detail.
<Transparent Polyimide Copolymer>

The transparent polyimide copolymer of the present invention is obtained by copolymerizing: (A) 4,4'-oxydiphthalic dianhydride and/or 2,2-bis(3,4-dicarboxyphenyl) hexafluoropropane dianhydride; and (B) at least one diamine and/or diisocyanate represented by the following Formulae (1) to (3):

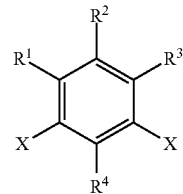

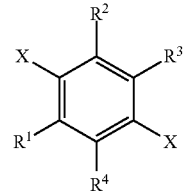

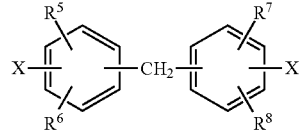

(wherein, X represents an amino group or an isocyanate group; $R^1$ to $R^8$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^8$ is not a hydrogen atom). As compared to conventional transparent polyimide copolymers, the above-described polyimide copolymer has superior heat resistance, transparency and thermal yellowing resistance and is also advantageous in that it has superior storage stability and mechanical strength. In the present invention, the term "transparent" means that, when the transparent polyimide copolymer of the present invention is made into the form of a 20 μm-thick film, the film has a total light transmittance of 85% or higher.

In the present invention, it is preferred that the terminals of the transparent polyimide copolymer be not amino group terminals. By not allowing the transparent polyimide copolymer to have an amino group terminal, it is enabled to avoid the feature that, when a terminal group of the polyimide copolymer is an amino group, a charge transfer complex is likely to be formed by interaction between the amino group and an imide carbonyl group. In addition, the feature that the amino group is easily oxidized and the transparency and thermal yellowing resistance are reduced due to the chromophore formation caused by the oxidation with time can also be avoided.

Specifically, a state in which the terminals of the transparent polyimide copolymer are not amino group terminals can be attained by the following method.

As the terminal groups of the polyimide copolymer, an acid anhydride group and an amino group can be arbitrarily selected by using either the acid dianhydride or the diamine and/or diisocyanate in excess in the synthesis of the polyimide copolymer.

When a terminal is an acid anhydride terminal, the acid anhydride terminal may be left as is with no subsequent treatment, or it may be hydrolyzed into a dicarboxylic acid. Alternatively, the acid anhydride terminal may be converted into an ester using an alcohol having not more than 4 carbon atoms. Further, the terminal may be blocked with a monofunctional amine compound and/or isocyanate compound. As the amine compound and/or isocyanate compound, any monofunctional primary amine compound and/or isocyanate compound can be used with no particular restriction. Examples thereof include aniline, methylaniline, dimethylaniline, trimethylaniline, ethylaniline, diethyl aniline, triethylaniline, aminophenol, methoxyaniline, aminobenzoic acid, biphenyl amine, naphthylamine, cyclohexylamine, phenyl isocyanate, xylylene isocyanate, cyclohexyl isocyanate, methylphenyl isocyanate and trifluoromethylphenyl isocyanate.

When a terminal is an amino group terminal, by blocking the terminal amino group with a monofunctional acid anhydride, the amino group can be prevented from remaining at the terminal. Here, as the acid anhydride, any monofunctional acid anhydride can be used with no particular restriction as long as it is converted into a dicarboxylic acid or tricarboxylic acid by hydrolysis. Examples of such acid anhydride include maleic anhydride, methylmaleic anhydride, dimethylmaleic anhydride, succinic anhydride, norbornene dicarboxylic anhydride, 4-(phenylethynyl)phthalic anhydride, 4-ethynylphthalic anhydride, phthalic anhydride, methylphthalic anhydride, dimethylphthalic anhydride, trimellitic anhydride, naphthalenedicarboxylic anhydride, 7-oxabicyclo[2.2.1]heptane-2,3-dicarboxylic anhydride, bicyclo[2.2.1]heptane-2,3-dicarboxylic anhydride, bicyclo[2.2.2]oct-5-ene-2,3-dicarboxylic anhydride, 4-oxatricyclo[5.2.2.0$^{2,6}$]undecane-3,5-dione, octahydro-1,3-dioxoisobenzofuran-5-carboxylic acid, hexahydrophthalic anhydride, methylhexahydrophthalic anhydride, dimethylcyclohexane dicarboxylic anhydride, 1,2,3,6-tetrahydrophthalic anhydride and methyl-4-cyclohexene-1,2-dicarboxylic anhydride.

As the component (B), diethyltoluene diamine (DETDA) represented by the Formula (1) or (2) wherein two of the $R^1$ to $R^4$ are ethyl groups and the other two are a methyl group and a hydrogen atom is preferred. Further, in the Formula (3), it is preferred that the $R^5$ to $R^8$ be each an alkyl group having 1 to 4 carbon atoms. By using these monocyclic or bicyclic raw materials, the imide group concentration in the main chain of the resulting polyimide copolymer can be increased, and the intermolecular interaction can be weakened by introducing a bulky substituent at the ortho position of an amino group. Consequently, the formation of a charge transfer complex can be inhibited and satisfactory transparency and solvent solubility can thus be attained.

In the copolymerization of the polyimide copolymer of the present invention, as long as the resulting polyimide copolymer can attain the above-described effects of the present invention, (C) second acid dianhydride and/or (D) second diamine and/or diisocyanate may also be copolymerized in addition to the components (A) and (B).

As the (C) second acid dianhydride, any acid dianhydride conventionally used in the production of a polyimide can be used with no particularly restriction. Examples of a common aromatic acid dianhydride include pyromellitic dianhydride, 1,2,3,4-benzenetetracarboxylic dianhydride, 3,3',4,4'-biphenyltetracarboxylic dianhydride, 2,3,3'4'-biphenyltetracarboxylic dianhydride, 2,3,2',3'-biphenyltetracarboxylic dianhydride, 3,3',4,4'-diphenylmethane tetracarboxylic dianhydride, 2,3,3',4'-diphenylmethane tetracarboxylic dianhydride, 3,3',4,4'-benzophenone tetracarboxylic dianhydride, 2,3,3',4'-benzophenone tetracarboxylic dianhydride, 2,3,2',3'-benzophenone tetracarboxylic dianhydride, 3,4'-oxydiphthalic dianhydride, 4,4'-oxydiphthalic dianhydride, 3,3'-oxydiphthalic dianhydride, diphenylsulfone-3,4,3',4'-tetracarboxylic dianhydride, diphenylsulfone-2,3,3',4'-tetracarboxylic dianhydride, diphenylsulfone-2,3,2',3'-tetracarboxylic dianhydride, 4,4'-[isopropylidene-bis[(1,4-phenylene)oxy]]diphthalic dianhydride, 5,5'-isopropylidene-bis(phthalic anhydride), 3,5'-isopropylidene-bis(phthalic anhydride), 3,3'-isopropylidene-bis(phthalic anhydride), 4,4'-(1,4-phenylenebisoxy)bisphthalic dianhydride, 4,4'-(1,3-phenylenebisoxy)bisphthalic dianhydride, 5,5'-[oxybis(4,1-phenyleneoxy)]bisphthalic dianhydride and 5,5'-[sulfonylbis(4,1-phenyleneoxy)]bisphthalic dianhydride. Further, examples of a silicon-containing acid dianhydride include 4,4'-(dimethylsilylene)bis(phthalic acid)1,2:1',2'-dianhydride, 4,4'-(methylethylsilylene)bis(phthalic acid)1,2:1',2'-dianhydride, 4,4'-[phenyl(methyl)silylene]bisphthalic acid-1,2:1',2'-dianhydride and 4,4'-diphenylsilylenebisphthalic acid-1,2:1',2'-dianhydride. Examples of a fluorine-containing acid dianhydride include 4,4'-(2,2-hexafluoroisopropylidene)diphthalic dianhydride, 3,4'-(2,2-hexafluoroisopropylidene)diphthalic dianhydride, 3,3'-(2,2-hexafluoroisopropylidene)diphthalic dianhydride and 4,4'-[2,2-hexafluoroisopropylidenebis[(1,4-phenylene)oxy]]diphthalic dianhydride. Examples of a fluorene cardo structure-based acid dianhydride include 5,5'-[9H-fluorene-9,9-diylbis(4,1-phenyleneoxy)]bis(isobenzofuran-1,3-dione) and 5,5'-[9H-fluorene-9,9-diylbis(1,1'-biphenyl-5,2-diyloxy)]bis(isobenzofuran-1,3-dione). Examples of an ester-based acid dianhydride include ethylene glycol-bis(trimellitate anhydride), 1,4-phenylene-bis(trimellitate anhydride), 1,3-phenylene-bis(trimellitate anhydride), 1,2-phenylene-bis(trimellitate anhydride), 2-acetoxypropane-1,3-diyl bis(1,3-dihydro-1,3-dioxoisobenzofuran-5-carboxylate), 5,5'-[ethylenebis(oxy)]bis(isobenzofuran-1,3-dione), oxybis(methyleneoxymethylene) bis(1,3-dihydro-1,3-dioxoisobenzofuran-5-carboxylate) and 4,4'-[isopropylidene-bis(4,1-phenyleneoxycarbonyl)]bisphthalic dianhydride.

Examples of an aliphatic acid dianhydride include 1,1'-bicyclohexane-3,3',4,4'-tetracarboxylic dianhydride, 1,1'-bicyclohexane-2,3,3'4'-tetracarboxylic dianhydride, 1,1'-bicyclohexane-2,3,2'3'-tetracarboxylic dianhydride, cyclohexane-1,2,4,5-tetracarboxylic dianhydride, 1,2,3,4-tetracarboxylic dianhydride, 1,3,3a,4,5,9b-hexahydro-5(tetrahydro-2,5-dioxo-3-furanyl)naphtho[1,2-c]furan-1,3-dione, 1,2,3,4-butanete tetracarboxylic dianhydride, 1,2,3,4-cyclobutane tetracarboxylic dianhydride, 1,2,3,4-cyclopentane tetracarboxylic dianhydride, 5-(2,5-dioxotetrahydrofuryl)-3-methyl-3-cyclohexene-1,2-dicarboxylic anhydride, bicyclo[2.2.2]oct-7-ene-2,3,5,6-tetracarboxylic dianhydride, bicyclo[2.2.2]octane-2,3,5,6-tetracarboxylic acid-2,3:5,6-dianhydride, bicyclo[2.2.1]heptane-2,3,5,6-tetracarboxylic acid-2,3:5,6-dianhydride and hexadecahydro-3a,11a-(2,5-dioxotetrahydrofuran-3,4-diyl)phenanthro[9,10-c]furan-1,3-dione.

Examples of an aliphatic ester-based acid dianhydride include biphenyl-4,4'-diyl bis(1,3-dioxo-1,3,3a,4,5,6,7,7a-octahydroisobenzofuran-5-carboxylate), bis(1,3-dioxo-1,3,3a,4,5,6,7,7a-octahydroisobenzofuran-5-carboxylic acid)-1,4-phenylene and bis(1,3-dioxo-1,3,3a,4,5,6,7,7a-octahydroisobenzofuran-5-carboxylic acid)-2-methyl-1,4-phenylene. Among the above-mentioned acid dianhydrides, from the standpoints of heat resistance, solvent solubility and availability, bicyclo[2.2.2]oct-7-ene-2,3,5,6-tetracarboxylic dianhydride, bicyclo[2.2.2]octane-2,3,5,6-tetracarboxylic acid-2,3:5,6-dianhydride, 4,4'-oxydiphthalic dianhydride, 4,4'-(2,2-hexafluoroisopropylidene)diphthalic dianhydride and 3,3',4,4'-biphenyltetracarboxylic dianhydride are preferred. As the (C) second acid dianhydride, these acid dianhydrides may be used individually, or two or more thereof may be used in combination. The amount of the (C) second acid dianhydride is preferably 2 mol or less with respect to 1 mol of the component (A).

In this case, as the (D) second diamine and/or diisocyanate, any diamine and/or diisocyanate usually used in the production of a polyimide copolymer can be used within a range that does not impair the effects of the present invention. In addition to the same diamine and/or diisocyanate as the component (B), for example, the (D) second diamine and/or diisocyanate is preferably at least one selected from the group consisting of compounds represented by the following Formulae (4) to (21):

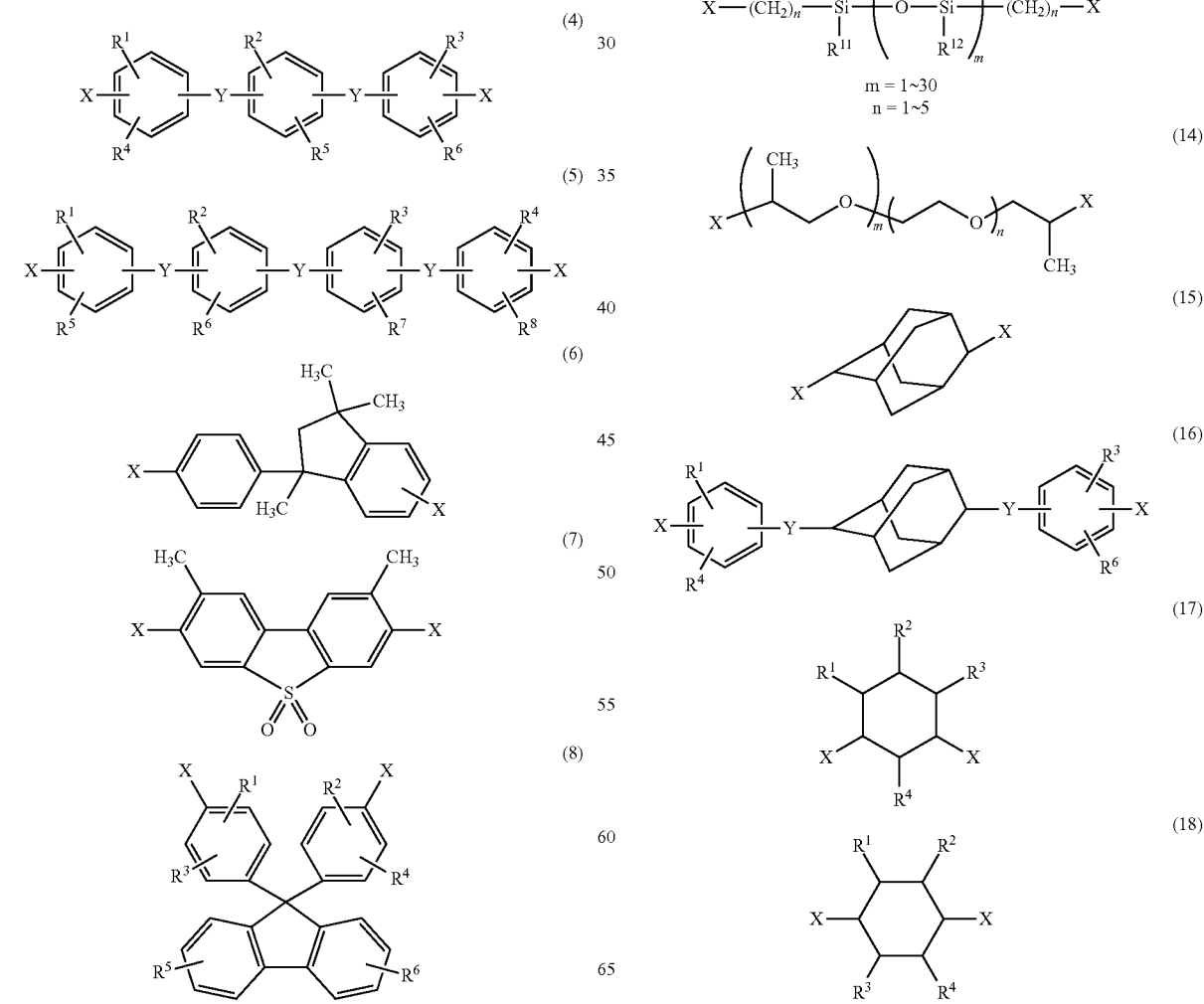

-continued

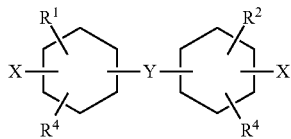
(19)

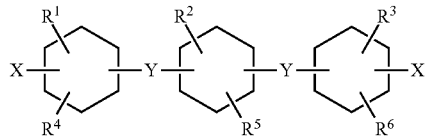
(20)

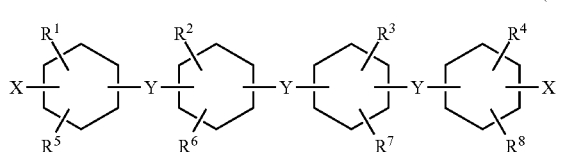
(21)

(wherein, X each independently represents —NH$_2$, —NCO, —CH$_2$NH$_2$ or —CH$_2$NCO;

R$^1$ to R$^8$ each independently represent a hydrogen atom, an alkyl group having 1 to 4 carbon atoms, an alkoxy group having 1 to 4 carbon atoms, a hydroxyl group, a carboxyl group, a trifluoromethyl group or an aryl group; R$^9$ to R$^{12}$ each independently represent an alkyl group having 1 to 4 carbon atoms or an aryl group; Y each independently represents a direct bond'

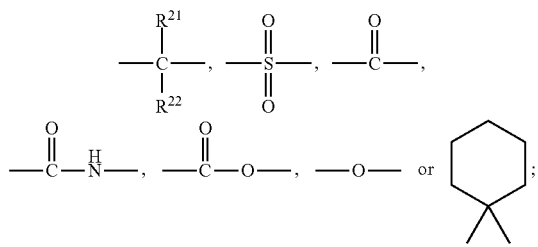

R$^{21}$ and R$^{22}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxyl group or a trifluoromethyl group). In cases where a diamine and/or a diisocyanate different from the component (B) is/are used as the (D) second diamine and/or diisocyanate, the amount thereof is preferably 2 mol or less with respect to 1 mol of the component (B).

The polyimide copolymer of the present invention can be produced by copolymerizing the components (A) and (B). Alternatively, a polyimide copolymer unit having a weight-average molecular weight of 700 to 80,000 or so can be produced first by copolymerizing the components (A) and (B) and the thus obtained polyimide copolymer unit can then be copolymerized with the (C) second acid dianhydride and/or the (D) second diamine and/or diisocyanate.

The polyimide copolymer of the present invention has a weight-average molecular weight of preferably 20,000 to 200,000, more preferably 35,000 to 150,000. When the weight-average molecular weight of the polyimide copolymer is outside this range, the ease of handling is deteriorated. In cases where the polyimide copolymer of the present invention is dissolved in an organic solvent, the concentration of the polyimide copolymer in the organic solvent can be, for example, but not particularly restricted to, 5 to 35% by mass or so. The polyimide copolymer can be used even at a concentration of lower than 5% by mass; however, when the concentration is low, the efficiency of operations such as coating of the polyimide copolymer is reduced. Meanwhile, when the concentration exceeds 35% by mass, the fluidity of the polyimide copolymer is poor and coating and the like of the polyimide copolymer is thus difficult, which also lead to deterioration of the workability.

<Production Method of Transparent Polyimide Copolymer>

A method of producing the transparent polyimide copolymer of the present invention will now be described. In order to obtain the transparent polyimide copolymer, either a thermal imidization method which thermally carries out dehydration ring-closure or a chemical imidization method using a dehydrating agent can be employed. The thermal imidization method and the chemical imidization method will be described below in detail in the order mentioned.

(Thermal Imidization Method)

In the production of the transparent polyimide copolymer of the present invention, copolymerization is performed in organic solvent, and the organic solvent used in this process is not particularly restricted. For example, N-methyl-2-pyrrolidone, N,N-dimethylacetamide, sulfolane, N,N-dimethylformamide, N,N-diethylacetamide, gamma-butyrolactone, alkylene glycol monoalkyl ether, alkylene glycol dialkyl ether, alkylcarbitol acetate or benzoic acid ester can be preferably used. These organic solvents may be used individually, or two or more thereof may be used in combination.

Further, in the production of the transparent polyimide copolymer of the present invention, a known imidization catalyst can be used. For example, pyridine can be usually used as an imidization catalyst; however, in addition thereto, examples of the imidization catalyst include substituted or unsubstituted nitrogen-containing heterocyclic compounds; N-oxide compounds of nitrogen-containing heterocyclic compounds; substituted or unsubstituted amino acid compounds; and hydroxyl group-containing aromatic hydrocarbon compounds and aromatic heterocyclic compounds. Particularly, for example, a lower alkyl imidazole such as 1,2-dimethylimidazole, N-methylimidazole, N-benzyl-2-methylimidazole, 2-methylimidazole, 2-ethyl-4-methylimidazole or 5-methylbenzimidazole, an imidazole derivative such as N-benzyl-2-methylimidazole, a substituted pyridine such as isoquinoline, 3,5-dimethylpyridine, 3,4-dimethylpyridine, 2,5-dimethylpyridine, 2,4-dimethylpyridine or 4-n-propylpyridine, or p-toluenesulfonic acid can be preferably used. The amount of the imidization catalyst to be used is preferably 0.01 to 2 times equivalent, particularly preferably 0.02 to 1 time equivalent or so, with respect to the amic acid unit of polyamic acid. By using the imidization catalyst, the physical properties of the resulting polyimide, particularly the elongation and the tensil strength, may be improved.

Moreover, in the production of the transparent polyimide copolymer of the present invention, in order to efficiently remove water generated by the imidization reaction, an azeotropic solvent can be added to the organic solvent. As the azeotropic solvent, for example, an aromatic hydrocarbon such as toluene, xylene or solvent naphtha, or an alicyclic hydrocarbon such as cyclohexane, methylcyclohexane or dimethylcyclohexane can be used. When an azeotropic solvent is used, it is added in an amount of 1 to 30% by mass or so, preferably 5 to 20% by mass, with respect to the total amount of the organic solvent.

In cases where the transparent polyimide copolymer of the present invention is produced by such a thermal imidization method, it is preferred that the polycondensation temperature be in a range of 150° C. to 200° C. and the reaction time be 1 to 200 hours. By controlling the polycondensation temperature at 150° C. or higher, the risk of causing delayed progress or incompletion of the imidization reaction can be avoided. Meanwhile, by controlling the polycondensation temperature at 200° C. or lower, oxidation of the solvents and unreacted materials as well as an increase in the resin concentration due to evaporation of the solvents can be inhibited.

(Chemical Imidization Method)

In cases where the transparent polyimide copolymer of the present invention is produced by a chemical imidization method, in the copolymer production step of copolymerizing the components (A) and (B), for example, in organic solvent, a dehydrating agent such as acetic anhydride and a catalyst such as triethylamine, pyridine, picoline or quinoline are added to a polyamic acid solution and the same operations as in the thermal imidization method are subsequently performed. By this, the transparent polyimide copolymer of the present invention can be obtained. In cases where the transparent polyimide copolymer of the present invention is produced by such a chemical imidization method, it is usually preferred that the polycondensation temperature be in a range of normal temperature to about 150° C. and the reaction time be 1 to 200 hours.

In the production of the transparent polyimide copolymer of the present invention, a dehydrating agent is used, and the dehydrating agent is, for example, an organic acid anhydride such as an aliphatic acid anhydride, an aromatic acid anhydride, an alicyclic acid anhydride or a heterocyclic acid anhydride, or a mixture of two or more thereof. Specific examples of the organic acid anhydride include acetic anhydride.

In the production of the transparent polyimide copolymer of the present invention, an imidization catalyst and an organic solvent are used, and these can be the same ones as those used in the thermal imidization method.

(Production of Polyimide Copolymer)

In the production of the transparent polyimide copolymer of the present invention, polycondensation can be carried out by any known method and the polycondensation method is not particularly restricted. For example, a method in which the entire amount of the component (A) is added to organic solvent and polycondensation is carried out by subsequently adding the component (B) to organic solvent in which the component (A) has been dissolved, or a method in which the entire amount of the component (B) is added to organic solvent in advance and polycondensation is carried out by subsequently adding the component (A) to this organic solvent in which the component (B) has been dissolved may be employed.

For the production of the transparent polyimide copolymer of the present invention, the components (A) and (B) can be copolymerized. Alternatively, an oligomer of polyimide copolymer can be produced by copolymerizing the components (A) and (B) and the transparent polyimide copolymer can then be produced using the thus obtained oligomer of polyimide copolymer. In this case, as described above, the oligomer of polyimide copolymer may also be copolymerized with (C) second acid dianhydride and/or (D) second diamine and/or diisocyanate. As the (C) second acid dianhydride and the (D) second diamine and/or diisocyanate, those mentioned above can be used. It is preferred that the above-described oligomer have an acid terminal.

As an organic solvent, catalyst, azeotropic solvent and dehydrating agent to be used in the production of the oligomer of polyimide copolymer, the organic solvent, catalyst, azeotropic solvent and dehydrating agent that are used in the above-described production of the polyimide copolymer of the present invention can be selected as appropriate based on the above-described respective imidization methods. Further, as for the conditions of the production of the oligomer of polyimide copolymer, the production can be carried out under the same conditions as those of the above-described imidization methods.

<Polyimide Resin Composition>

The polyimide resin composition of the present invention comprises the transparent polyimide copolymer of the present invention and at least one of the below-described fillers, coloring agents, organic solvents and other additives. The content of the transparent polyimide copolymer of the present invention is preferably in a range of 5% by mass to 99.9% by mass with respect to the mass of the total solid content in the polyimide resin composition of the present invention. Arbitrary component(s) other than the transparent polyimide copolymer may be incorporated in any amount as long as it is in such a range that does not adversely affect the object of the present invention; however, it is preferred that the arbitrary component(s) be incorporated in a range of 0.1% by mass to 95% by mass with respect to the mass of the total solid content in the polyimide resin composition.

Examples of the fillers include inorganic fillers such as silica, alumina and mica; and organic fillers such as PTFE and polyimide.

As the coloring agents, those that are suitable for the intended application can be selected as required from the group consisting of organic pigments, inorganic pigments and dyes.

As the organic solvents, those that are capable of dissolving the transparent polyimide copolymer of the present invention individually or as a mixed solution can be used with no particular restriction. For example, N-methyl-2-pyrrolidone, N,N-dimethyl acetamide, sulfolane, N,N-dimethylformamide, N,N-diethylacetamide, gamma-butyrolactone, alkylene glycol monoalkyl ether, alkylene glycol dialkyl ether, alkylcarbitol acetate or benzoic acid ester can be preferably used. These organic solvents may be used individually, or two or more thereof may be used in combination.

Examples of the above-described other additives include polymerization inhibitors, thickening agents, thixotropic agents, suspending agents, antioxidants, dispersants, pH adjusters, antifoaming agents, leveling agents, surfactants and various resins.

The polyimide resin composition of the present invention is suitable for applications such as paints, printing inks, adhesives, coating materials for organic EL devices, color filters and base polymers of photosensitive polymers.

The method of producing the polyimide resin composition of the present invention is not particularly restricted, and any known method can be employed. Examples thereof include a method in which the polyimide copolymer of the present invention is dissolved in a solvent and then the above-described filler(s) and additive(s) are further mixed and dispersed therein; and a method of melt-kneading these components using an extruder, a Banbury mixer or the like.

<Molded Article>

The molded article of the present invention is obtained by molding the polyimide resin composition of the present invention.

The molded article of the present invention is suitable for applications such as films and sheets that can be used in electronic materials and circuit boards, examples of which include optical fibers, optical waveguides, light filters, lenses, optical filters, adhesive sheets, interlayer insulating films, semiconductor insulating protective films, TFT (Thin Film Transistor) liquid crystal insulating films, liquid crystal alignment films, solar cell protective films, antireflection films and flexible display substrates.

The method of producing the molded article of the present invention is not particularly restricted, and any known method can be employed. Examples thereof include a method in which the polyimide copolymer of the present invention is coated on the surface of a substrate and the resultant is then dried to remove a solvent(s) by evaporation, followed by molding into the form of a coating film, film or sheet; and a method in which the polyimide copolymer of the present invention is injected into a die and a solvent(s) is/are then removed by evaporation to obtain a molded article.

As a method of forming a coating film, a film or a sheet from the transparent polyimide copolymer of the present invention, the polyimide copolymer of the present invention can be coated on the surface of a substrate by a known method such as spin coating, dip coating, spray coating or casting in accordance with the viscosity and the like thereof and subsequently dried.

As the substrate, an arbitrary substrate may be used in accordance with the intended use of the final product. Examples of the material of the substrate include fiber products such as clothes; glass; synthetic resins such as polyethylene terephthalate, polyethylene naphthalate, polyethylene, polycarbonate, triacetylcellulose, cellophane, polyimide, polyamide, polyphenylene sulfide, polyether imide, polyether sulfone, aromatic polyamide and polysulfone; metals; ceramics; and papers. The substrate may be transparent or colored with various pigments or dyes mixed into the material constituting the substrate, and the surface of the substrate may also be processed into a mat form.

For drying of the thus coated transparent polyimide copolymer of the present invention, a conventional heat-drying furnace can be used. Examples of the atmosphere inside the drying furnace include air, inert gases (nitrogen and argon) and vacuum. The drying temperature can be selected as appropriate in accordance with the boiling point of the solvent in which the polyimide copolymer of the present invention is dissolved, and it may be usually 80 to 350° C., preferably 100 to 320° C., particularly preferably 120 to 250° C. The drying time can be selected as appropriate in accordance with the thickness, concentration and kinds of solvents, and it may be 1 second to 360 minutes or so.

After the drying, a product having the transparent polyimide copolymer of the present invention as a coating film can be directly obtained, or the resulting coating film can be separated from the substrate to obtain a film.

Further, in cases where a molded article is obtained using a die, a molded article can be obtained by injecting a prescribed amount of the polyimide resin composition of the present invention into a die (particularly preferably a rotary die) and subsequently drying the injected polyimide resin composition at the same temperature for the same time period as in the molding conditions of a film or the like.

EXAMPLES

Example 1

To a 500-mL separable four-necked flask equipped with a stainless steel anchor stirrer, a nitrogen-introducing tube and a Dean-Stark trap, 56.11 g (0.18 mol) of 4,4'-oxydiphthalic anhydride (ODPA), 32.09 g (0.18 mol) of DETDA, 326.87 g of γ-butyrolactone (GBL), 2.85 g of pyridine and 33 g of toluene were poured, and the atmosphere in the reaction mixture was replaced with nitrogen. The reaction mixture was stirred for 30 minutes at 80° C. under nitrogen gas flow to dissolve ODPA, and the resultant was then heated to 180° C. and stirred under heating for 6 hours. Water generated by the reaction was removed from the reaction mixture as an azeotropic mixture with toluene and pyridine. After the completion of the reaction, the reaction mixture was cooled to room temperature to obtain a polyimide solution having a concentration of 20% by mass. The thus obtained polyimide copolymer had a structure represented by the following Formula (22):

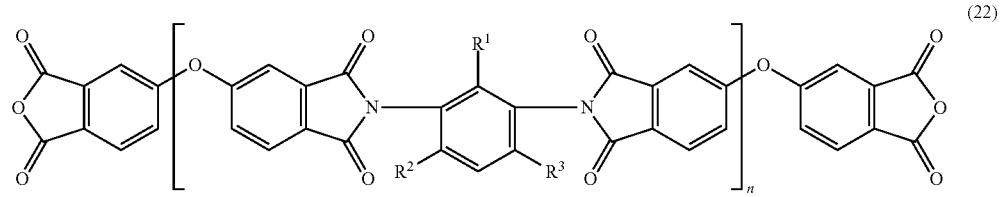

(wherein, one of $R^1$ to $R^3$ is a methyl group and the other two are ethyl groups).

Example 2

To the same apparatus as used in Example 1, 46.80 g (0.15 mol) of ODPA, 38.16 g (0.15 mol) of 4,4'-diamino-3,3',5,5'-tetramethyldiphenylmethane, 147.67 g of GBL, 2.39 g of pyridine and 50 g of toluene were poured, and the atmosphere in the reaction mixture was replaced with nitrogen. The reaction mixture was stirred for 30 minutes at 80° C. under nitrogen gas flow to dissolve ODPA, and the resultant was then heated to 180° C. and stirred under heating for 7 hours. Water generated by the reaction was removed from the reaction mixture as an azeotropic mixture with toluene and pyridine. After the completion of the reaction, 100 g of GBL was added when the reaction mixture was cooled to 120° C., thereby obtaining a polyimide solution having a concentration of 25% by mass. The thus obtained polyimide copolymer had a structure represented by the following Formula (23):

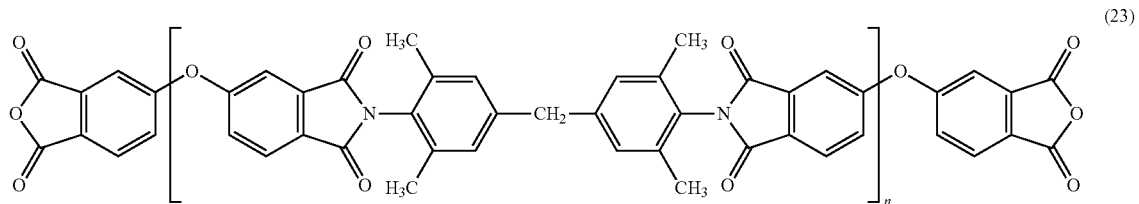

Example 3

To the same apparatus as used in Example 1, 44.70 g (0.1 mol) of 2,2-bis(3,4-dicarboxyphenyl)hexafluoropropane dianhydride (6FDA), 17.83 g (0.1 mol) of DETDA, 128.44 g of GBL, 3.16 g of pyridine and 50 g of toluene were poured, and the atmosphere in the reaction mixture was replaced with nitrogen. The reaction mixture was stirred for 30 minutes at 80° C. under nitrogen gas flow to dissolve 6FDA, and the resultant was then heated to 180° C. and stirred under heating for 6 hours. Water generated by the reaction was removed from the reaction mixture as an azeotropic mixture with toluene and pyridine. After the completion of the reaction, 36.70 g of GBL was added when the reaction mixture was cooled to 120° C., thereby obtaining a polyimide solution having a concentration of 25% by mass. The thus obtained polyimide copolymer had a structure represented by the following Formula (24):

reaction was removed from the reaction mixture by azeotropic distillation with toluene.

Next, after cooling the reaction mixture to 130° C., 21.03 g (0.105 mol) of 3,4'-diaminodiphenyl ether (mDADE) and 40 g of GBL were added, and the resultant was stirred for 5 minutes. Then, 17.58 g (0.07 mol) of BTA and 40 g of GBL were further added, and the resulting mixture was heated to 180° C. and allowed to react for 6 hours under heating and stirring. Water generated by this reaction was removed from the reaction mixture as an azeotropic mixture with toluene and pyridine. After the completion of the reaction, 51.43 g of GBL was added when the reaction mixture was cooled to 120° C., thereby obtaining a polyimide solution having a concentration of 25% by mass. The thus obtained polyimide copolymer had a structure represented by the following Formula (25):

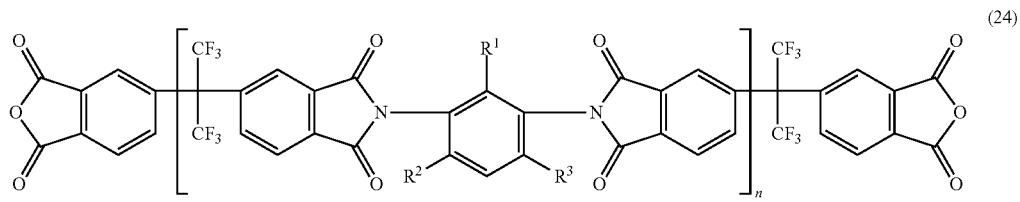

(wherein, one of $R^1$ to $R^3$ is a methyl group and the other two are ethyl groups).

Example 4

To the same apparatus as used in Example 1, 32.57 g (0.105 mol) of ODPA, 12.48 g (0.07 mol) of DETDA, 100

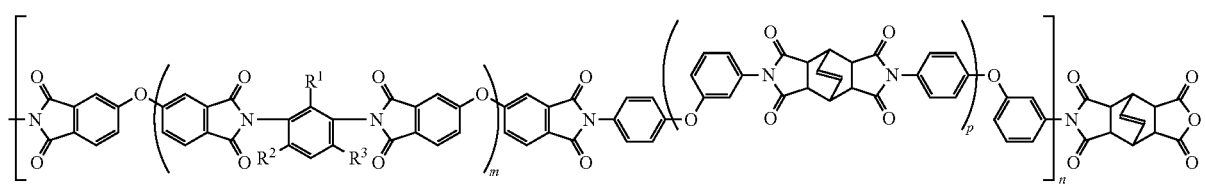

g of GBL, 2.77 g of pyridine and 50 g of toluene were poured, and the atmosphere in the reaction mixture was replaced with nitrogen. The reaction mixture was stirred for 30 minutes at 80° C. under nitrogen gas flow to dissolve ODPA, and the resultant was then heated to 180° C. and stirred under heating for 2 hours. Water generated by the (wherein, one of $R^1$ to $R^3$ is a methyl group and the other two are ethyl groups).

Example 5

To the same apparatus as used in Example 1, 32.57 g (0.105 mol) of ODPA, 12.48 g (0.07 mol) of DETDA, 96.91 g of N-methyl-2-pyrrolidone (NMP), 2.77 g of pyridine and 50 g of toluene were poured, and the atmosphere in the reaction mixture was replaced with nitrogen. The reaction mixture was stirred for 30 minutes at 80° C. under nitrogen gas flow to dissolve ODPA, and the resultant was then heated to 180° C. and stirred under heating for 2 hours. Water generated by the reaction was removed from the reaction mixture by azeotropic distillation with toluene.

Next, after cooling the reaction mixture to 130° C., 45.41 g (0.105 mol) of bis[4-(3-aminophenoxy)phenyl]sulfone (mBAPS) and 100 g of NMP were added, and the resultant was stirred for 5 minutes. Then, 17.64 g (0.07 mol) of BTA and 40 g of NMP were further added, and the resulting mixture was heated to 180° C. and allowed to react for 6 hours under heating and stirring. Water generated by this reaction was removed from the reaction mixture as an azeotropic mixture with toluene and pyridine. After the completion of the reaction, 67.69 g of NMP was added when the reaction mixture was cooled to 120° C., thereby obtaining a polyimide solution having a concentration of 25% by mass. The thus obtained polyimide copolymer had a structure represented by the following Formula (26):

thereby obtaining a white ink containing 80 parts of titanium dioxide with respect to 100 parts of the transparent polyimide resin.

Comparative Example 1

To the same apparatus as used in Example 1, 35.31 g (0.12 mol) of BPDA, 21.39 g (0.12 mol) of DETDA, 209.50 g of NMP, 1.90 g of pyridine and 50 g of toluene were poured, and the atmosphere in the reaction mixture was replaced with nitrogen. The reaction mixture was stirred for 30 minutes at 80° C. under nitrogen gas flow to dissolve BPDA, and the resultant was then heated to 180° C. and stirred under heating for 6 hours. Water generated by the reaction was removed from the reaction mixture as an azeotropic mixture with toluene and pyridine. After the completion of the reaction, the reaction mixture was cooled to 120° C., thereby obtaining a polyimide solution having a concentration of 20% by mass. The thus obtained polyimide copolymer had a structure represented by the following Formula (27):

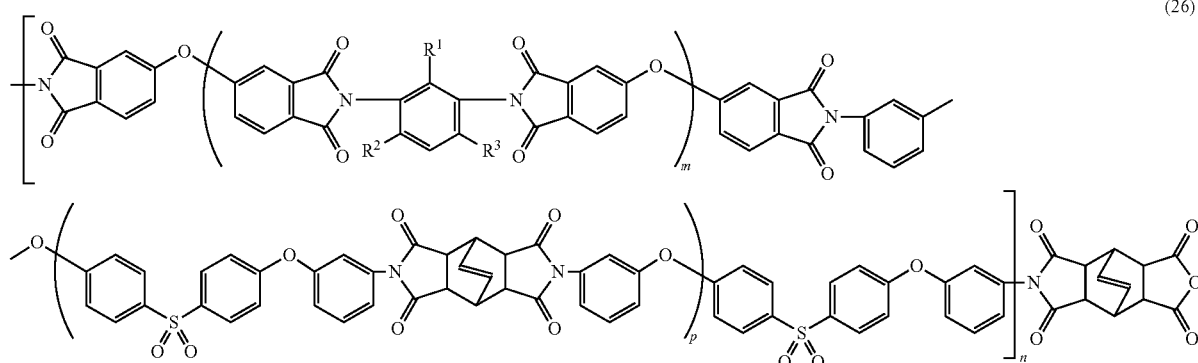

(wherein, one of $R^1$ to $R^3$ is a methyl group and the other two are ethyl groups).

Example 6

A titanium dioxide dispersion was obtained by mixing 10 parts of titanium dioxide (TIPAQUE R-830, manufactured by Ishihara Sangyo Kaisha, Ltd.) and 10 parts of GBL and stirring the resulting mixture to homogeneity. To this titanium dioxide dispersion, 50 parts of the transparent polyimide varnish obtained in Example 4 was added, and the resultant was stirred to homogeneity under vacuum degassing. The resulting white composition was strained through a 400-mesh polyethylene filter to remove coarse particles,

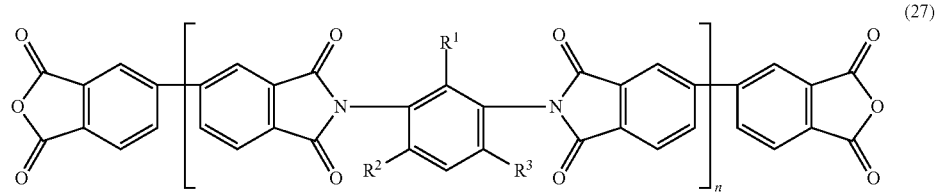

(wherein, one of $R^1$ to $R^3$ is a methyl group and the other two are ethyl groups).

Comparative Example 2

To the same apparatus as used in Example 1, 22.62 g (0.1 mol) of cyclohexane-1,2,4,5-tetracarboxylic dianhydride (H-PMDA), 23.80 g (0.1 mol) of 3,3'-dimethylmethylenedicyclohexylamine, 221.06 g of NMP, 3.16 g of pyridine and 50 g of toluene were poured, and the atmosphere in the reaction mixture was replaced with nitrogen. Under nitrogen gas flow, the reaction mixture was heated to 180° C. and stirred under heating for 5 hours. Water generated by the reaction was removed from the reaction mixture as an azeotropic mixture with toluene and pyridine. After the completion of the reaction, the reaction mixture was cooled to room temperature, thereby obtaining a polyimide solution having a concentration of 15% by mass. The thus obtained polyimide copolymer had a structure represented by the following Formula (28):

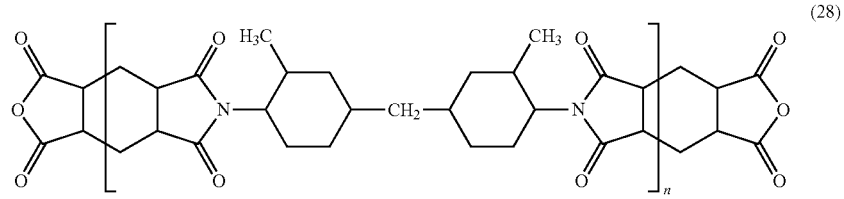

Comparative Example 3

A titanium dioxide dispersion was obtained by mixing 10 parts of titanium dioxide (TIPAQUE R-830, manufactured by Ishihara Sangyo Kaisha, Ltd.) and 10 parts of NMP and stirring the resulting mixture to homogeneity. To this titanium dioxide dispersion, 83 parts of the fully alicyclic polyimide varnish obtained in Comparative Example 2 and 42 parts of NMP as a diluent were added, and the resultant was stirred to homogeneity under vacuum degassing. The resulting white composition was strained through a 400-mesh polyethylene filter to remove coarse particles, thereby obtaining a white ink containing 80 parts of titanium dioxide with respect to 100 parts of the fully alicyclic polyimide resin.

<Film-Forming Property>

The polyimide copolymers obtained in Examples 1 to 5 and Comparative Examples 1 and 2 were each coated on a silicon wafer by a spin coating method and then pre-dried for 10 minutes on a 120° C. hot plate. The resulting pre-dried film was detached from the silicon wafer, fixed on a stainless steel frame and subsequently dried at 180° C. for 30 minutes and then at 250° C. for 1 hour. As for the evaluation of the film-forming property, an evaluation "×" was given when the film could not maintain a film shape by itself when detached from the silicon wafer after the pre-drying at 120° C.; an evaluation "Δ" was given when the film was so brittle that it could not maintain a film shape after the drying at 250° C.; and an evaluation "○" was given when the film was able to maintain a film shape by itself even after the completion of the drying at 250° C. The results thereof are shown in Tables 1 and 2.

It is noted here that, since the polyimide copolymer obtained in Comparative Example 2 could not maintain a film shape under the film-forming conditions for the evaluation of film-forming property, a film formed under the following conditions was used for the below-described evaluations. Specifically, the polyimide copolymer obtained in Comparative Example 2 was coated on a silicon wafer by a spin coating method and then pre-dried for 10 minutes on a 120° C. hot plate. The resulting pre-dried film was detached from the silicon wafer, fixed on a stainless steel frame and subsequently dried at 200° C. for 1 hour.

<Measurement of Thickness>

For the films that were prepared for the evaluation of film-forming property, the thickness was measured. The measurement was performed using ABC Digimatic Indicator (manufactured by Mitutoyo Corporation). The results thereof are shown in Tables 1 and 2.

<Glass Transition Temperature>

For the films that were prepared for the evaluation of film-forming property, the glass transition temperature was measured. The measurement was performed using DSC6200 (manufactured by Seiko Instruments Inc.). Each film was heated to 500° C. at a heating rate of 10° C./min, and the midpoint glass transition temperature was adopted as the glass transition temperature of the film. The results thereof are shown in Tables 1 and 2.

<5% Thermal Weight Loss Temperature>

For the films that were prepared for the evaluation of film-forming property, the 5% thermal weight loss temperature was measured. The measurement was performed using TG/DTA6200 (manufactured by Seiko Instruments Inc.). As for the heating condition, each film was heated at a rate of 10° C./min, and the temperature at which the mass was reduced by 5% was measured. The results thereof are shown in Tables 1 and 2.

<Mechanical and Physical Properties>

The films prepared for the evaluation of film-forming property were each processed into a test piece of 100 mm in length×10 mm in width, and the tensile elastic modulus, tensil strength and elongation were measured using a creep meter (RE2-33005B, manufactured by Yamaden Co., Ltd.). Each film was measured 5 times, and the data showing the maximum value in tensile strength was adopted. The chuck distance was 50 mm and the tensile rate was 5 mm/sec.

<Total Light Transmittance>

For the films that were prepared for the evaluation of film-forming property, the total light transmittance was measured in accordance with JIS K7361. The measurement was performed using a haze meter NDH4000 (manufactured by Nippon Denshoku Industries Co., Ltd.). The results thereof are shown in Tables 1 and 2.

<Haze>

For the films that were prepared for the evaluation of film-forming property, the haze was measured in accordance with JIS K7136. The measurement was performed using a haze meter NDH4000 (manufactured by Nippon Denshoku Industries Co., Ltd.). The results thereof are shown in Tables 1 and 2.

<Color Difference b-Value>

For the films that were prepared for the evaluation of film-forming property, the color difference b-value was measured. The measurement was performed using a color difference meter CR-5 (manufactured by Konica Minolta, Inc.). The results thereof are shown in Tables 1 and 2.

<Whiteness and Yellowness>

The varnishes obtained in Example 6 and Comparative Example 3 were each coated on a polyimide film (KAPTON 200EN) by a spin coating method, and the thus coated polyimide film was fixed on a stainless steel frame and dried in a 120° C. incubator for 10 minutes and then at 200° C. for 1 hour, thereby obtaining an 18 μm-thick film of white polyimide on KAPTON 200EN. For each of the thus obtained films, the whiteness and yellowness were measured in accordance with ASTM E313-73 using a color difference meter CR-5 (manufactured by Konica Minolta, Inc.). Further, as a thermal yellowing resistance test, after measuring the initial whiteness and yellowness, the whiteness and yellowness were also measured for the film that was allowed to float in a 260° C. solder bath for 10 seconds and the film that was left to stand for 5 hours in a 200° C. incubator so as to verify the thermal yellowing resistance. The results thereof are shown in Table 3.

In the present invention, the thermal yellowing resistance was evaluated based on the change in the whiteness and yellowness values before and after the heat treatment. Specifically, the film of interest was subjected to a 10-second heat treatment in a 260° C. solder bath or a 5-hour heat treatment in a 200° C. incubator, and the whiteness and yellowness were measured before and after the heat treatment. As for the whiteness, a larger value indicates a higher whiteness of the subject coating film, and a higher whiteness after the heat treatment means that the whiteness was better maintained even after the heat treatment. Further, a smaller numerical difference between before and after the heat treatment indicates superior thermal yellowing resistance. As for the yellowness, a larger value indicates a stronger yellowish tone, and a larger value after the heat treatment means a stronger yellowish tone of the subject coating film. Further, a larger numerical difference between before and after the heat treatment indicates inferior thermal yellowing resistance.

TABLE 1

|  | Example 1 | Example 2 | Example 3 | Example 4 | Example 5 |
|---|---|---|---|---|---|
| Storage stability | ○ | ○ | ○ | ○ | ○ |
| Thickness (μm) | 23 | 23 | 21 | 21 | 32 |
| Glass transition temperature (° C.) | 339 | 312 | 353 | 310 | 273 |
| 5% weight loss temperature (° C.) | 510 | 520 | 512 | 445 | 466 |
| Film-forming property | ○ | ○ | ○ | ○ | ○ |
| Tensile elastic modulus (GPa) | 1.71 | 2.41 | 1.76 | 2.22 | 2.22 |
| Tensil strength (MPa) | 94 | 107 | 85 | 98 | 115 |
| Elongation (%) | 17 | 11 | 9 | 41 | 13 |
| Total light transmittance (%) | 89 | 88 | 91 | 88 | 88 |
| Haze (%) | 0.28 | 0.2 | 0.19 | 0.18 | 0.57 |
| Color difference b-value | 2.63 | 2.74 | 1.32 | 2.31 | 3.69 |

TABLE 2

|  | Comparative Example 1 | Comparative Example 2 |
|---|---|---|
| Storage stability | ○ | ○ |
| Thickness (μm) | 28 | 21 |
| Glass transition temperature (° C.) | 500 or higher | 231 |
| 5% weight loss temperature (° C.) | 523 | 443 |
| Film-forming property | ○ | Δ |
| Tensile elastic modulus (GPa) | 2.01 | 2.78 |
| Tensil strength (MPa) | 115 | 101 |
| Elongation (%) | 10 | 9 |
| Total light transmittance (%) | 81 | 91 |
| Haze (%) | 0.45 | 0.24 |
| Color difference b-value | 27.91 | 1.52 |

TABLE 3

|  |  | Example 6 | Comparative Example 3 |
|---|---|---|---|
| Whiteness (%) | Initial | 69.89 | 51.14 |
|  | Solder 260° C./10 s | 69.63 (−0.26) | 45.80 (−5.34) |
|  | 200° C./5 h | 65.56 (−4.33) | 25.15 (−25.99) |
| Yellowness (%) | Initial | 0.06 | 5.11 |
|  | Solder 260° C./10 s | 0.09 (+0.03) | 7.79 (+2.68) |
|  | 200° C./5 h | 1.52 (+1.46) | 14.71 (+9.60) |

*The values in parentheses indicate the difference from the respective initial whiteness or yellowness values.

According to Tables 1 to 3, the polyimide copolymers of the present invention exhibited excellent heat resistance with a glass transition temperature of 270° C. or higher while maintaining high transparency with a total light transmittance of 85% or higher. Moreover, because of the excellent heat resistance, the polyimide copolymers of the present invention also have excellent resistance to yellowing caused by the drying step of distilling off the solvents and long-term exposure to a high-temperature environment and thus show a characteristic feature of not impairing the color tone of a coloring agent or the like.

The invention claimed is:

1. A transparent polyimide copolymer obtained by copolymerizing:

(A) 4,4'-oxydiphthalic dianhydride; and (B) at least one diamine and/or diisocyanate represented by the following Formulae (1) or (2):

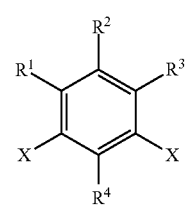

(1)

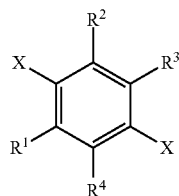

(2)

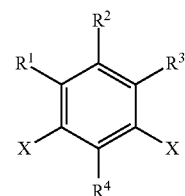

(1)

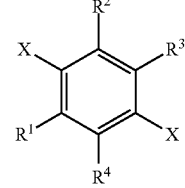

(2)

(wherein, X represents an amino group or an isocyanate group; $R^1$ to $R^4$ each independently represent a hydrogen atom, an alkyl group having 1 to 4 carbon atoms, an alkenyl group having 2 to 4 carbon atoms or an alkoxy group having 1 to 4 carbon atoms; and at least one of said $R^1$ to $R^4$ is not a hydrogen atom).

2. The transparent polyimide copolymer according to claim 1, having no amino group terminal.

3. The transparent polyimide copolymer according to claim 1, wherein two of said $R^1$ to $R^4$ in said Formula (1) or (2) of said (B) are ethyl groups and the other two are a methyl group and a hydrogen atom.

4. The transparent polyimide copolymer according to claim 1, wherein (C) second acid dianhydride and/or (D) second diamine and/or diisocyanate is/are further copolymerized.

5. A polyimide resin composition comprising the transparent polyimide copolymer according to claim 1.

6. A molded article obtained by molding the polyimide resin composition according to claim 5.

7. A method of producing a transparent polyimide copolymer, said method comprising:

the oligomer production step of producing an oligomer of transparent polyimide copolymer by copolymerizing (A) 4,4'-oxydiphthalic dianhydride with (B) at least one diamine and/or diisocyanate represented by the following Formulae (1) to (2):

(wherein, X represents an amino group or an isocyanate group; $R^1$ to $R^4$ each independently represent a hydrogen atom, an alkyl group having 1 to 4 carbon atoms, an alkenyl group having 2 to 4 carbon atoms or an alkoxy group having 1 to 4 carbon atoms; and at least one of said $R^1$ to $R^4$ is not a hydrogen atom); and the polyimide copolymer production step of producing a transparent polyimide copolymer by copolymerizing said oligomer of transparent polyimide copolymer produced in said oligomer production step with (C) second acid dianhydride and (D) second diamine and/or diisocyanate.

8. The method of producing an oligomer of transparent polyimide copolymer according to claim 7, wherein said transparent polyimide copolymer oligomer produced in said oligomer production step has an acid terminal.

9. The method of producing a transparent polyimide copolymer according to claim 7, wherein two of said $R^1$ to $R^4$ in said Formula (1) or (2) of said (B) are ethyl groups and the other two are a methyl group and a hydrogen atom.

\* \* \* \* \*